(12) United States Patent
De Cnodder et al.

(10) Patent No.: US 7,372,845 B2
(45) Date of Patent: May 13, 2008

(54) TELECOMMUNICATION NETWORK WITH FAST-REROUTE FEATURES

(75) Inventors: Stefaan Jozef De Cnodder, Lille (BE); Riza Cetin, Antwerp (BE)

(73) Assignee: Alcatel, Paris (FR)

( * ) Notice: Subject to any disclaimer, the term of this patent is extended or adjusted under 35 U.S.C. 154(b) by 857 days.

(21) Appl. No.: 10/608,495

(22) Filed: Jun. 30, 2003

(65) Prior Publication Data

US 2004/0081085 A1    Apr. 29, 2004

(30) Foreign Application Priority Data

Jul. 1, 2002    (EP) .................................. 02291628

(51) Int. Cl.
*H04L 12/28*    (2006.01)
(52) U.S. Cl. ........................ 370/351; 370/217; 709/239
(58) Field of Classification Search ................ 370/351; 709/239; 713/200
See application file for complete search history.

(56) References Cited

U.S. PATENT DOCUMENTS

2002/0112072 A1* 8/2002 Jain ........................... 709/239
2003/0229807 A1* 12/2003 Qiao et al. .................. 713/200

OTHER PUBLICATIONS

Gan et al, "A Method for MPLS LSP Fast-Reroute Using RSVP Detours", 'Online! Apr. 10, 2001, IETF, INET XP00224746.

* cited by examiner

*Primary Examiner*—Chi Pham
*Assistant Examiner*—Albert T. Chou
(74) *Attorney, Agent, or Firm*—Sughrue Mion, PLLC

(57) ABSTRACT

A telecommunication network with fast-reroute features wherein a method is used to release, by means of a "Path_Tear Message", a Label Switched Path [LSP] established between linked routers (A, B, C, D, E). The routers are linked in cascade according to a Main Path (AB, BC, CD, DE) and are further linked in another order according to at least one Detour Path (ac, ce; bd). The Path_Tear Message includes a tag indicating, in each router, whether this Path_Tear Message should be immediately forwarded towards a downstream-located router or not. It is thereby possible to obtain a faster release of any unused Label Switched Path [LSP] than waiting for a timeout of 1 to 2 minutes, as it is currently the case.

19 Claims, 1 Drawing Sheet

TELECOMMUNICATION NETWORK WITH FAST-REROUTE FEATURES

Figure 1:
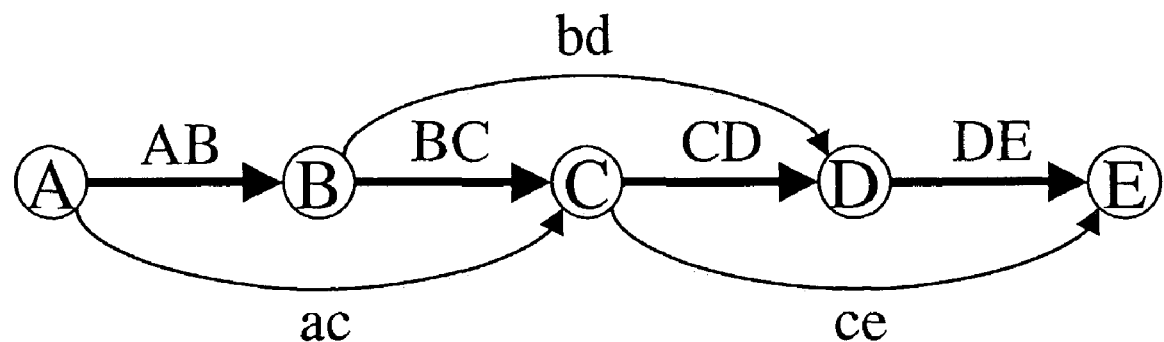

The present invention relates to a method to release, by means of a Path_Tear Message, a Label Switched Path [LSP] established between linked routers of a telecommunication network, said routers being linked in cascade according to a Main Path and being further linked in another order according to at least one Detour Path.

Such a telecommunication network with fast-reroute features is generally known in the art. Therein, a call from an ingress router, say router A, to a receiver router, say router E, is transmitted through a "Label Switched Path" [LSP] set-up by means of "Path Messages" transmitted via the linked routers, say routers B, C and D. From the ingress router A to the receiver router E, the Path Messages are transmitted through the routers linked in a first predetermined order, e.g. A-B, B-C, C-D and D-E, in order to set up a Main LSP, and through the routers linked in another predetermined order, e.g. A-C, B-D and/or C-E to set up Detour LSPs. In this way, in case of failure of a link, there exists always an alternative solution.

When, for instance, the call is ended or when the ingress router A wants to reroute the paths, both the Main LSP and the Detour LSPs have to be cancelled. To cancel a LSP, a "Path_Tear Message" is sent by the ingress router A towards the receiver router E. Each router receiving the Path_Tear Message releases the corresponding Label Switched Path (LSP).

Because of interoperable reasons, a merging router, i.e. a router where the Main LSP and at least one Detour LSP merge, needs to receive a Path_Tear Message both from the Main LSP and from the Detour LSP(s) prior to cancel a call. If not, the merging router has to wait for a timeout of 1 to 2 minutes prior to propagate downstream the received Path_Tear Message. Indeed, in case only one Path_Tear Message is received at a merging router, e.g. over a Detour LSP, this router is not able to know whether or not the Path_Tear Message is to release only the Detour LSP or to release the whole LSP, i.e. including the Main LSP and possible other Detour LSPs. By default, the merging router always assumes the former, but when it receives also a Path_Tear Message from the Main LSP, it knows that the whole LSP has to be torn down. However, in case of a failure, the Path_Tear Message will never arrive over the Main LSP and it has to wait for the above-mentioned long timeout of typically 1 to 2 minutes.

An object of the present invention is to provide a telecommunication network with fast-reroute features of the above known type but wherein the decision to releasing one or more Label Switched Paths [LSP] is taken much faster.

According to the invention, this object is achieved due to the fact that said Path_Tear Message includes a tag indicating, to the router receiving said Path_Tear Message, whether said Path_Tear Message should be immediately forwarded towards a downstream located router.

In this way, it is possible to obtain a faster release of any unused Label Switched Path [LSP] than waiting for the above-mentioned 1 to 2 minutes timeout.

Another characterizing embodiment of the present invention is that said tag further indicates through which of said Main Path or said Detour Path or both, starting from the receiving router, said Path_Tear Message should be immediately forwarded towards said downstream-located router.

The Path_Tear Message is thereby easily propagated downstream through the whole telecommunication network.

Another characterizing embodiment of the present invention is that, for said router receiving said Path_Tear Message, said release method further comprises a step of releasing all the Label Switched Paths arriving at this receiving router from upstream-located routers via the Main Path and via the Detour Path linking said upstream-located routers and said receiving router.

All the upstream Label Switched Paths are thereby also cancelled.

In a preferred embodiment, said tag further indicates which Label Switched Paths to release, and, for the router receiving said Path_Tear Message, said release method comprises a step of releasing immediately each Label Switched Path indicated by said tag.

More particularly, said tag is a Sender Template whereof can be derived the Label Switched Paths to be release.

This is particularly useful in case the ingress router initiates the path release.

The present invention also relates to a telecommunication network with a plurality of routers interconnected via links through which Label Switched Paths are established, said routers being linked in cascade according to a Main Path and being further linked in another order according to at least one Detour Path, and said routers being adapted to transmit a Path_Tear Message towards downstream-located routers, said Path_Tear Message indicating that a Label Switched Path has to be released.

In the telecommunication network according to the present invention, the router transmitting said Path_Tear Message is adapted to include in said Path_Tear Message a tag indicating, to the router receiving said Path_Tear Message, whether said Path_Tear Message should be immediately forwarded towards a downstream-located router, and the receiving router is adapted to detect said tag in said received Path_Tear Message, to release each Label Switched Path indicated by said tag, and, according to said tag, to forward immediately said Path_Tear Message towards said downstream-located router.

Owing to the tag, the Label Switched Path [LSP] can be released relatively fast.

In a preferred embodiment, the present invention is characterized in that said tag further indicates through which path said Path_Tear Message should be forwarded downstream, and in that, according to said tag, said receiving router is further adapted to forward immediately said Path_Tear Message towards said downstream-located router through said Main Path (AB, BC, CD, DE) or through said Detour Path (ac, ce, bd) or through both.

The Label Switched Paths are thereby released in an accurate way. Also in a preferred embodiment, the present invention is characterized in that the telecommunication network is a Multi-Protocol Label Switching [MPLS] telecommunication network.

Such a telecommunication network is particularly well adapted to handle several Label Switched Paths.

Further characterizing embodiments of the present telecommunication network with fast-reroute features and the Label Switched Path release method used therein are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Figure 2:
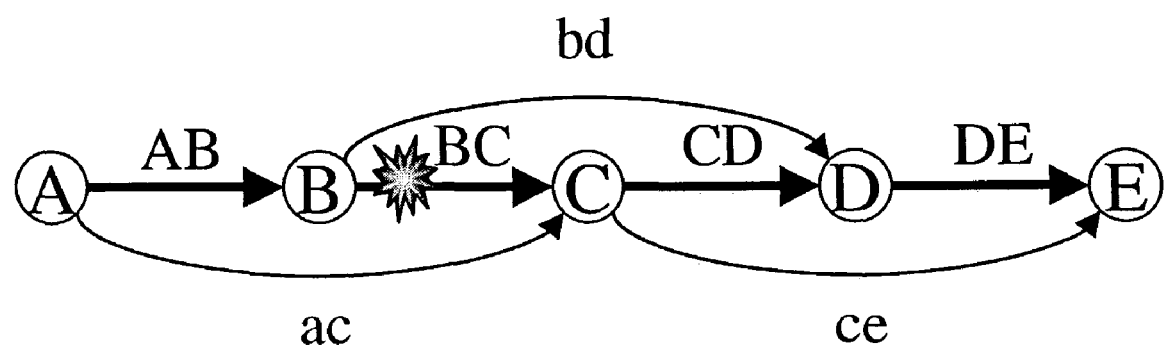

The above and other objects and features of the invention will become more apparent and the invention itself will be best understood by referring to the following description of an embodiment taken in conjunction with the accompanying drawings wherein:

FIG. 1 represents a telecommunication network with fast-reroute features comprising a Main Label Switched Path and Detour Label Switched Paths according to the invention; and FIG. 2 represents the telecommunication network of FIG. 1 with a link failure between two routers.

The simplified telecommunication network shown at FIG. 1 comprises an ingress router or Data Flow Sender A and a receiver router E interconnected by means of other routers or nodes B, C and D. This telecommunication network has fast-reroute features as will become clear later. It is for instance a well-known Multi-Protocol Label Switching [MPLS] telecommunication network.

In this network, a call from the sender or router A to the receiver or router E is initiated according to the known Resource Reservation Protocol [RSVP] or the like whereby "Label Switched Paths" [LSPs] are set-up by means of "Path Messages" transmitted from the router A to the router E via other linked routers such as B, C and D. The path Messages are transmitted through the routers A, B, C, D and E linked in this first order to form a Main route constituted by sections AB, BC, CD and DE. A like-named Main or Protected LSP is then set up on this route AB, BC, CD and DE. Additionally, path Messages are also transmitted through the routers A, B, C, D and E linked in a different order to form Detour routes such as sections ac, ce and bd. Like-named Detour LSPs are then set up on these routes ac, ce and bd.

Some of the routers are called "Merging Routers". A merging router is a router where at least two Label Switched Paths arrive. In this example, the routers C, D and E are merging routers.

Owing to the existence of Protected and Detour LSPs, in case of failure of a link or route, there exists always an alternative solution. Indeed, if for instance, as shown at FIG. 2, there is a failure on the link BC between the routers B and C, two routes between A and E are still available:
  a preferred route via the Main LSP AB, Detour LSP bd and Main LSP DE;
  and another route via the Detour LSPs ac and Main LSPs CD and DE.

When, for instance, the call between the sender A and the receiver E is ended or when the sender A wants to reroute the paths or even when there is a LSP failure, both the Protected LSP and the Detour LSPs have to be cancelled. To cancel a LSP, a "Path_Tear Message" is sent by the router that wants to cancel the LSP towards the receiver E. Each router receiving the Path_Tear Message cancels the corresponding upstream Label Switched Path and forwards the Path_Tear Message towards the downstream-located routers.

An extra object or tag is added in the Path_Tear Message by the router that wants to cancel the LSP. This tag indicates which path(s) have to be released and is called "LSP_Teardown_Tag". In case the ingress router or sender A wants to cancel the LSP, the tag may be a "Sender Template".

On reception of a Path_Tear Message, a merging router immediately checks whether or not the Path_Tear Message, received over a Detour LSP, is to release only this Detour LSP or to release the complete LSP, i.e. the Main LSP as well as the Detour LSP(s). This is done by analyzing the tag in the Path_Tear Message. Two cases may appear:
  if the Path_Tear Message was initiated by the ingress router A, the merging router compares the source address of the sender with the Sender Template received as tag with the Path_Tear Message; or
  more generally, the LSP_Teardown_Tag explicitly indicates which path(s) have to be released.

The latter case is preferred because in some implementations the source address is no longer visible by the Resource Reservation Protocol [RSVP]. Another advantage is that a Path_Tear Message issued by the sender A does not necessarily imply that all the LSPs have to be released, which LSP to release in then indicated by the tag.

The LSP paths indicated by or derived from the tag are cancelled by the router receiving the Path_Tear Message in the upstream direction towards routers located upstream with respect to this receiving router.

The receiving router further forwards the Path_Tear Message downstream, i.e. towards routers, e.g. the receiver E, located downstream with respect to this receiving router.

It is to be noted that, to prevent that the upstream router B re-establishes a LSP with a "Path_Refresh Message", the router C has to make sure that its "Local Path State" is not deleted immediately but is set to a stalled state.

It is also to be noted that, optionally, router C may send a "Resv_Tear Message" (Reserved Tear Message) upstream, this Resv_Tear Message may also contain a LSP_Teardown_Tag to indicate to the router downstream the failure that it may generate a Path_Tear Message immediately. A Resv_Tear Message is used to cancel a "Resv Message" (Reserved Message) that is an answer from the receiver E to the ingress router A to a path Message, which itself is the first packet of a call.

It is finally to be noted that in case of a telecommunication network using the Internet Protocol [IP], the source address is the IP source address of the sender.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to release a Label Switched Path established between linked routers of a telecommunication network via a Path_Tear Message, the method comprising:
  linking said routers in cascade according to a main path;
  linking said routers in another order according to at least one detour path; and
  releasing at least some of the linked routers via said Path_Tear Message,
  wherein said Path_Tear Message comprises a tag indicating, to the router receiving said Path_Tear Message, which of Label Switched Paths available to the receiving router are to be released.

2. The release method according to claim 1, wherein said Path_Tear Message is received, in the receiving router, via said detour path linking an upstream-located router to said receiving router.

3. The release method according to claim 1, wherein said tag further indicates through which of said main path or said detour path or both, starting from the receiving router, said Path_Tear Message should be forwarded towards said downstream-located router.

4. The release method according to claim 1, wherein said releasing comprises releasing the Label Switched Paths arriving at a receiving router from upstream-located routers via said main path and via said detour path linking said upstream-located routers and said receiving router.

5. A method to release a Label Switched Path established between linked routers of a telecommunication network via a Path_Tear Message, the method comprising:
   linking said routers in cascade according to a main path;
   linking said routers in another order according to at least one detour path; and
   releasing at least some of the linked routers via said Path_Tear Message,
   wherein said Path_Tear Message comprises a tag indicating which of Label Switched Paths to release and wherein said releasing comprises releasing each Label Switched Path indicated by said tag.

6. The release method according to claim 5, wherein said tag is a Sender Template.

7. A telecommunication network comprising:
   a plurality of routers; and
   a plurality of links interconnecting the plurality of routers, where Label Switched Paths are established using said plurality of links,
   wherein said routers are linked in cascade according to a main path and are linked in another order according to at least one detour path,
   wherein said routers transmit a Path_Tear Message towards downstream-located routers, said Path_Tear Message indicating which Label Switched Paths have to be released,
   wherein the router transmitting said Path_Tear Message adds to said Path-Tear Message a tag indicating, to the router receiving said Path_Tear Message, which of the Label Switched Paths available to the receiving router are to be released,
   wherein the receiving router detects said tag in said received Path_Tear Message, releases each Label Switched Path indicated by said tag, and, according to said tag, forwards said Path_Tear Message towards said downstream-located router.

8. The telecommunication network according to claim 7, wherein said tag further indicates through which path said Path_Tear Message should be forwarded downstream, and wherein, according to said tag, said receiving router forwards said Path_Tear Message towards said downstream-located router through said Main Path or through said Detour Path or through both without waiting for a timeout.

9. The telecommunication network according to claim 7, wherein said receiving router is adapted to release the Label Switched Paths arriving at said receiving router from upstream-located routers via said main path and via said detour path linking said upstream-located routers and said receiving router.

10. The telecommunication network according to claim 7, wherein said tag further indicates to the receiving router which of said Label Switched Paths (LSPs) comprising a main path and at least one detour path are to be released, and wherein said receiving router releases each Label Switched Path indicated by said tag without waiting for a timeout.

11. The telecommunication network according to claim 7, wherein said receiving router transmits, towards downstream-located router, a Reserved_Tear Message including said tag,
   wherein said downstream-located router transmits said Reserved_Tear Message towards a downstream-located router, and
   wherein said downstream-located router immediately generates a Path_Tear Message including said tag, and forwards said Path_Tear Message towards another downstream-located router without waiting for a timeout.

12. The telecommunication network according to claim 7, wherein both said main path and at least one detour path arrive at said receiving router.

13. The telecommunication network according to claim 7, wherein said telecommunication network is a Multi-Protocol Label Switching telecommunication network.

14. The telecommunication network comprising:
   the routers;
   a plurality of links interconnecting said plurality of routers, where Label Switched Paths are established using said plurality of links,
   wherein said routers are linked in cascade according to the main path and are linked in another order according to at least one said detour path,
   wherein said routers transmit the Path_Tear Message towards downstream-located routers, said Path_Tear Message indicating that a Label Switched Path has to be released,
   wherein the router transmitting said Path_Tear Message adds said tag and said information to said Path_Tear Message, the tag indicating, to the router receiving said Path_Tear Message, whether said Path_Tear Message should be forwarded towards a downstream-located router,
   wherein the receiving router detects said tag in said received Path_Tear Message, releases each Label Switched Path indicated by said tag, and, according to said tag, forwards said Path_Tear Message towards said downstream-located router, and
   wherein said routers operate according to the release method mentioned in claim 1.

15. The release method according to claim 1, wherein said releasing comprises releasing without waiting for a timeout, each Label Switched Path indicated by said tag.

16. A system for releasing a Label Switched Path established between linked routers of a telecommunication network via a Path_Tear Message, the system comprising:
   a plurality of routers;
   a plurality of links linking said routers to form a main path and linking said routers in another order to form at least one detour path;
   a release module which releases at least some of the linked routers via said Path_Tear Message,
   wherein said Path_Tear Message comprises a tag indicating, to the router receiving said Path_Tear Message, whether said Path_Tear Message should be forwarded towards a downstream-located router and indicating which of Label Switched Paths available to the receiving router should be released.

17. The system according to claim 16, wherein the releasing module releases each LSP indicated in the tag without waiting for a timeout.

18. The release method according to claim 1, wherein the tag indicates which paths out of the main path and the detour path and wherein the Path_Tear Message is received only via one of the main path and the detour path and is forwarded downstream without waiting for a timeout.

19. The release method according to claim 1, wherein a receiving router is linked to other routers via the main path and via the detour path and wherein, when the receiving router receives the Path_Tear Message via only one of the main path and the detour path, the receiving router forwards the received Path_Tear Message downstream without waiting for a timeout.

* * * * *